(12) United States Patent
Sumi et al.

(10) Patent No.: US 8,303,012 B2
(45) Date of Patent: Nov. 6, 2012

(54) PICK-UP STYLE UTILITY VEHICLE WITH EXPANDABLE CARGO BED

(75) Inventors: Kenichi Sumi, Takasago (JP); Yoshitaka Nishikawa, Osaka (JP); Tetsuaki Shirai, Kobe (JP)

(73) Assignee: Kawasaki Jukogyo Kabushiki Kaisha, Tokyo (JP)

( * ) Notice: Subject to any disclaimer, the term of this patent is extended or adjusted under 35 U.S.C. 154(b) by 393 days.

(21) Appl. No.: 12/648,583

(22) Filed: Dec. 29, 2009

(65) Prior Publication Data
US 2011/0156442 A1   Jun. 30, 2011

(51) Int. Cl.
*B60N 3/00* (2006.01)
(52) U.S. Cl. ............... 296/24.43; 296/183.1; 296/64
(58) Field of Classification Search ............ 296/165, 296/171, 175, 24.3, 24.33, 24.4, 24.43, 26.08, 296/62.09, 26.1, 26.11, 183.1, 183.2, 190.03, 296/191, 37.6, 64, 65.01, 66, 65.09, 26.09; 280/756, 749
See application file for complete search history.

(56) References Cited

U.S. PATENT DOCUMENTS

| | | |
|---|---|---|
| 6,905,159 B1 | 6/2005 | Saito et al. |
| 6,994,388 B2 | 2/2006 | Saito et al. |
| 7,249,798 B2 | 7/2007 | Saito et al. |
| 7,578,544 B1 * | 8/2009 | Shimamura et al. ....... 296/183.2 |
| 7,581,780 B2 * | 9/2009 | Shimamura et al. ....... 296/183.2 |
| 2011/0156434 A1 * | 6/2011 | Itou et al. ................ 296/66 |
| 2011/0169289 A1 * | 7/2011 | Arnold et al. ............. 296/10 |

\* cited by examiner

*Primary Examiner* — Jason S Morrow
(74) *Attorney, Agent, or Firm* — Wenderoth, Lind & Ponack, LLP (57) ABSTRACT

A pick-up style utility vehicle has a front seat, a rear seat, and a cargo bed in this order from a front of the vehicle. The cargo bed has at least left and right stationary side panels and expandable side panels that extend forward from the front ends of the stationary side panels. The cargo bed is changeable between an expanded state in which the cargo bed is expanded forward into a rear riding space in front of the cargo bed and a non-expanded state not occupying the rear riding space. The expandable side panels are rotatable about rotational shafts forward and rearward in a vehicle width direction so as to be shiftable between a position in the expanded state and a position in the non-expanded state.

6 Claims, 9 Drawing Sheets

# PICK-UP STYLE UTILITY VEHICLE WITH EXPANDABLE CARGO BED

BACKGROUND OF THE INVENTION

1. Field of the Invention

The present invention relates to a pick-up style utility vehicle which can expand a cargo bed in a front direction so as to optimize an area or capacity of a cargo bed space or a passenger space according to user demands.

2. Description of the Related Art

At present, utility vehicles of various styles are used. Other than a pick-up style utility vehicle with a relatively large cargo bed behind a seat, there is a straddle-type all terrain vehicle having a handle bar, or the like.

Typically, the pick-up style utility vehicle is more practical than the handle bar type utility vehicle belonging to the straddle-type all terrain vehicle. The pick-up style utility vehicle is used for hunting in fields and mountains, conveyance of lumber, movement in golf courses, golf course maintenance, and the like.

The present applicants have formerly applied the inventions relating to the pick-up style utility vehicle with a cargo bed whose area or capacity can be expanded. Their applications have been filed, which are, for example, U.S. Pat. Nos. 6,905,159, 6,994,388, and 7,249,798.

A configuration of the pick-up style utility vehicle disclosed in the respective documents has a front seat including a driver's seat, a rear seat, and a cargo bed in this order from front. The rear seat is changed between a used state and a retracted state to switch between 2 passengers transformation and 4 passengers transformation. In the 2 passengers transformation, a front portion of the cargo bed can be expanded to a riding space occupied by the rear seat in the used state.

Figure 12:
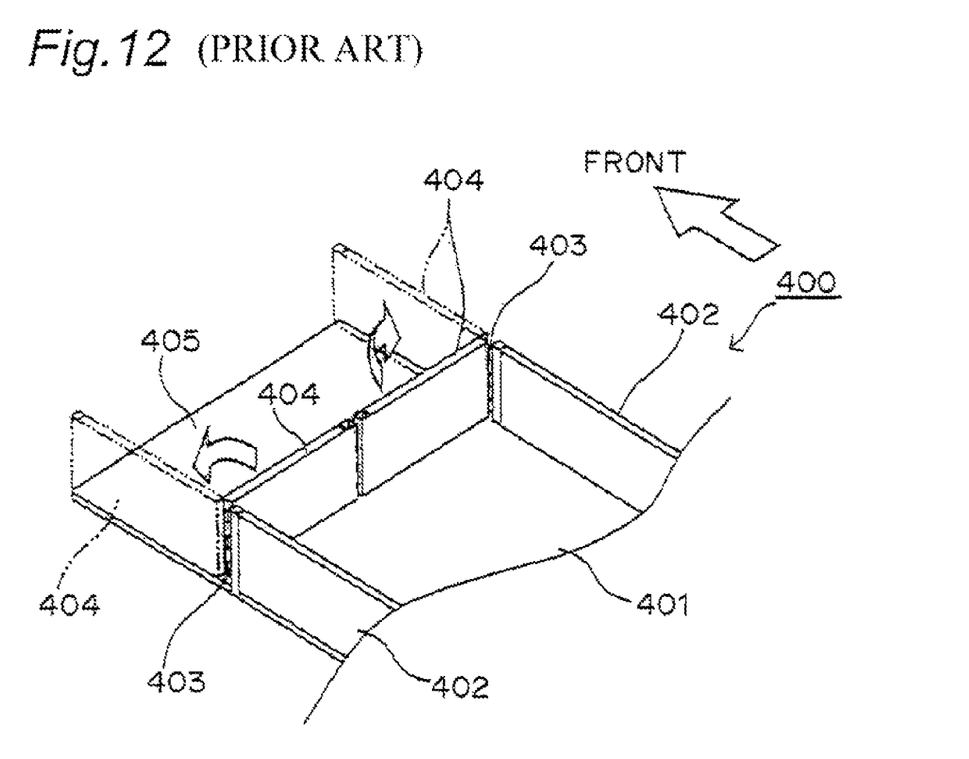
FIG. 12 is a perspective view of a cargo bed of a pick-up style utility vehicle of the related art.

FIG. 12 shows an example of the expandable cargo bed disclosed in the related art documents. A cargo bed 400 has a stationary bottom plate 401, right and left stationary side panels 402, a pair of right and left expandable side panels 404 provided at the front ends of the stationary side panels 402 and rotatably supported about hinge shafts 403, and an expandable bottom plate 405 provided at the front end of the stationary bottom plate 401.

With the above configuration, when 4 passengers transformation is changed to 2 passengers transformation and the cargo bed 400 is expanded, the expandable side panels 404 of the cargo bed 400 are rotated about the hinge shafts 403 and are opened forward to the left and right, as indicated by the imaginary lines of FIG. 12, so as to form the side panels of the expandable portions of the cargo bed 400 extended forward from the front ends of the stationary side panels 402.

SUMMARY OF THE INVENTION

An object of the present invention is to provide expandable side panels having new side panel forming means different from the related art, as forming means of the side panels of the expandable portions of a cargo bed.

To achieve the above object, the present invention provides a pick-up style utility vehicle having a front seat, a rear seat, and a cargo bed in this order from front, wherein the cargo bed has at least left and right stationary side panels and expandable side panels extended forward from the front ends of the stationary side panels and is changeable between an expanded state in which the cargo bed is expanded forward to a rear riding space in front of the cargo bed and a non-expanded state not occupying the rear riding space, and the expandable side panels are rotatable about rotational shafts forward and rearward in a vehicle width direction so as to be shiftable between a position in the expanded state and a position in the non-expanded state.

With the above configuration, the side panels of the expandable portions of the cargo bed can be formed by rotating the expandable side panels forward and rearward.

According to the present invention, preferably, the utility vehicle further has a screen shield partitioning the cargo bed and the rear riding space, the expandable side panels are coupled to the screen shield, and the screen shield is shifted between a position in the expanded state and a position in the non-expanded state so that the expandable side panels are rotatable forward and rearward.

With the above configuration, the expandable side panels are shifted according to the shift of the screen shield so that both can be integrally shifted. As a result, the shifting operation of the screen shield and the expandable side panels with the change of the cargo bed can be easily changed.

According to the present invention, preferably, in the configuration in which the utility vehicle further has a screen shield partitioning the cargo bed and the rear riding space, the expandable side panels are coupled to the screen shield, and the screen shield is shifted between a position in the expanded state and a position in the non-expanded state so that the expandable side panels are rotatable forward and rearward, wherein a first engaging protrusion portion and a second engaging protrusion portion are provided in the lower portion of the screen shield, a long hole is provided in each of the expandable side panels, the first engaging protrusion portion is movable in the long hole along the long hole, and the second engaging protrusion portion is coupled to each of the expandable side panels via a link mechanism.

With the above configuration, the configuration in which the expandable side panels are rotatable forward and rearward can be easily formed by the long hole and the link mechanism.

According to the present invention, preferably, in the configuration in which the utility vehicle further has a screen shield partitioning the cargo bed and the rear riding space, the expandable side panels are coupled to the screen shield, and the screen shield is shifted between a position in the expanded state and a position in the non-expanded state so that the expandable side panels are rotatable forward and rearward, wherein a first engaging protrusion portion and a second engaging protrusion portion are provided in the lower portion of the screen shield, an L-shaped long hole is provided in each of the expandable side panels, and the first engaging protrusion portion and the second engaging protrusion portion are movable in the L-shaped long hole along the L-shaped long hole.

With the above configuration, the configuration in which the expandable side panels are rotatable forward and rearward can be easily formed by the L-shaped long hole.

According to the present invention, preferably, each of the expandable side panels is coupled to each of the stationary side panels via a hinge portion provided at the front end of the stationary side panel.

With the above configuration, the configuration in which the expandable side panels are rotatable forward and rearward can be easily formed.

According to the present invention, preferably, a third engaging protrusion portion engaging each of the expandable side panels is provided at the front end of each of the stationary side panels, a long hole is provided in each of the expandable side panels, and the third engaging protrusion portion is movable in the long hole along the long hole.

With the above configuration, the rotation of each of the expandable side panels forward and rearward can be smoothly performed.

According to the present invention, preferably, each of the expandable side panels has a fixing member, and each of the expandable side panels is fixed by the fixing member in a position in the expanded state and a position in the non-expanded state.

With the above configuration, each of the expandable side panels can be reliably fixed in a position in the expanded state and a position in the non-expanded state.

DETAILED DESCRIPTION OF THE PREFERRED EMBODIMENTS

First Embodiment of the Present Invention

Figure 1:
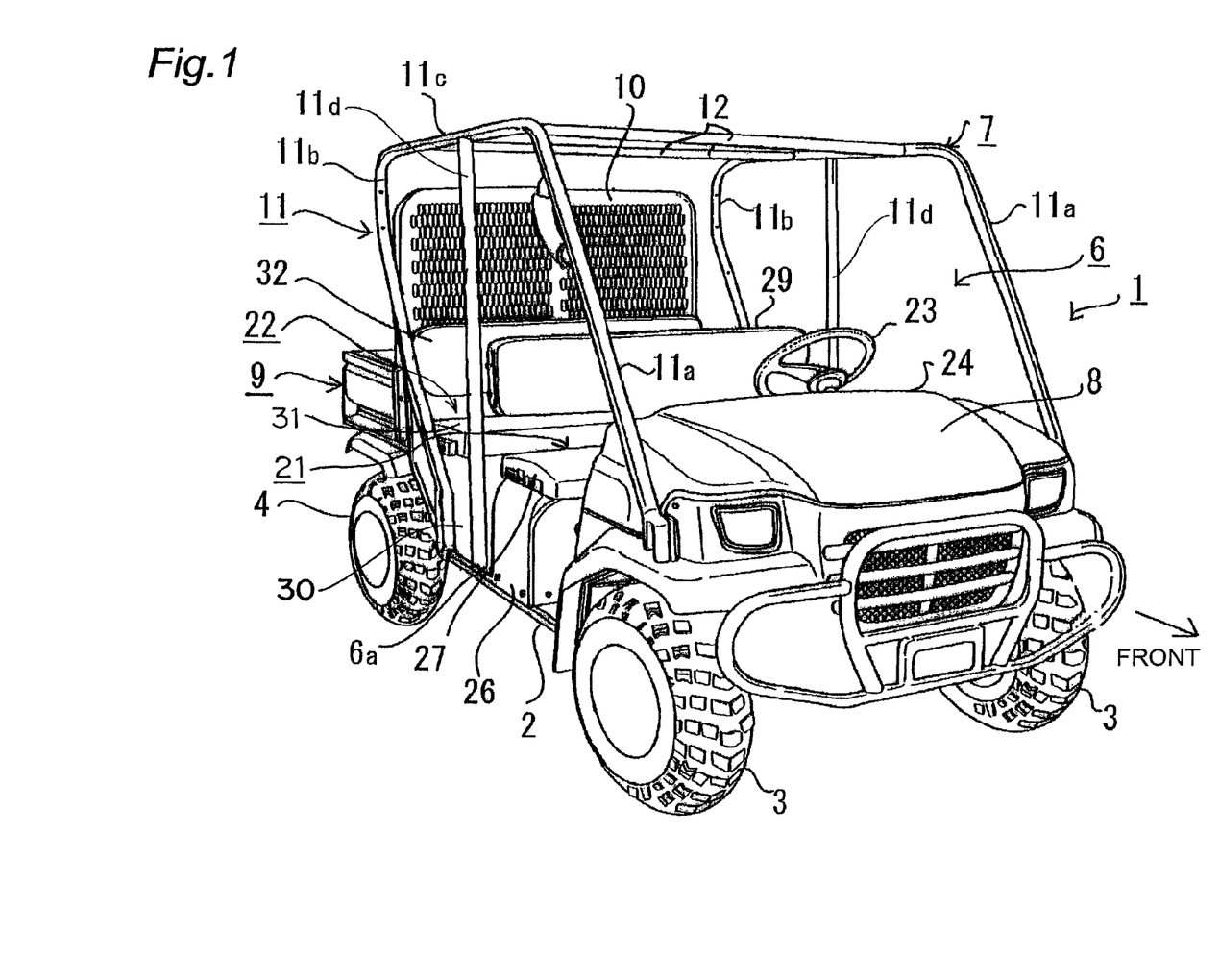
FIG. 1 is an overall perspective view of a pick-up style utility vehicle according to a first embodiment of the present invention.
Figure 2:
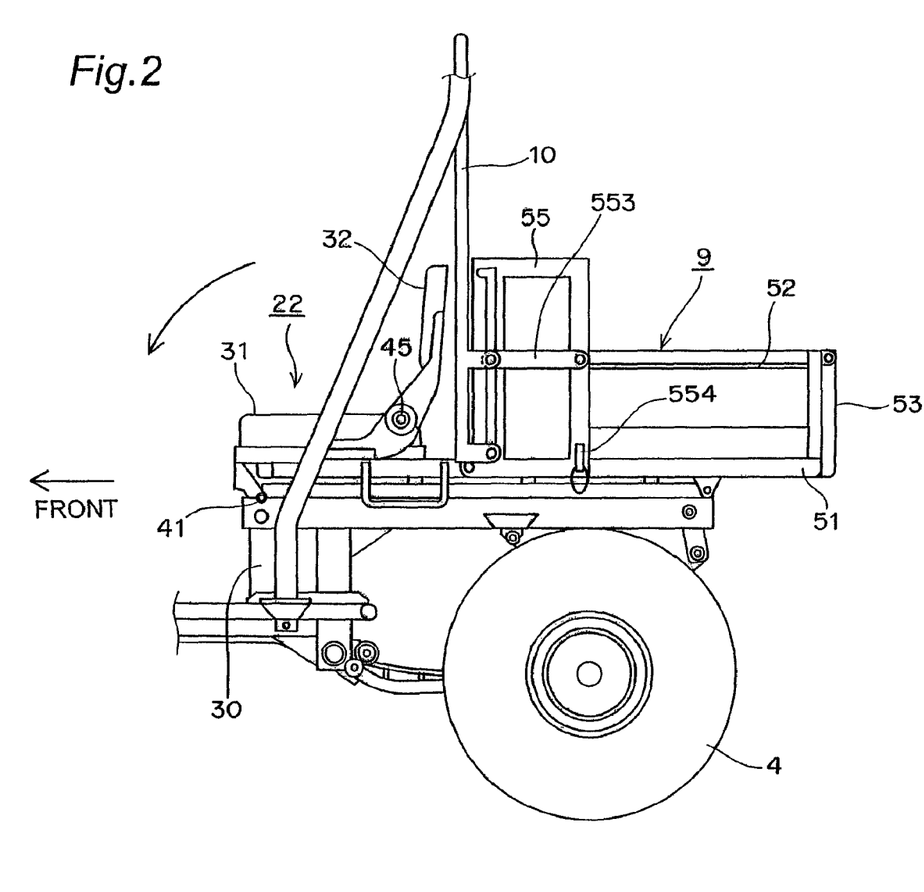
FIG. 2 is a left side view of a cargo bed 9 in 4 passengers transformation.
Figure 3:
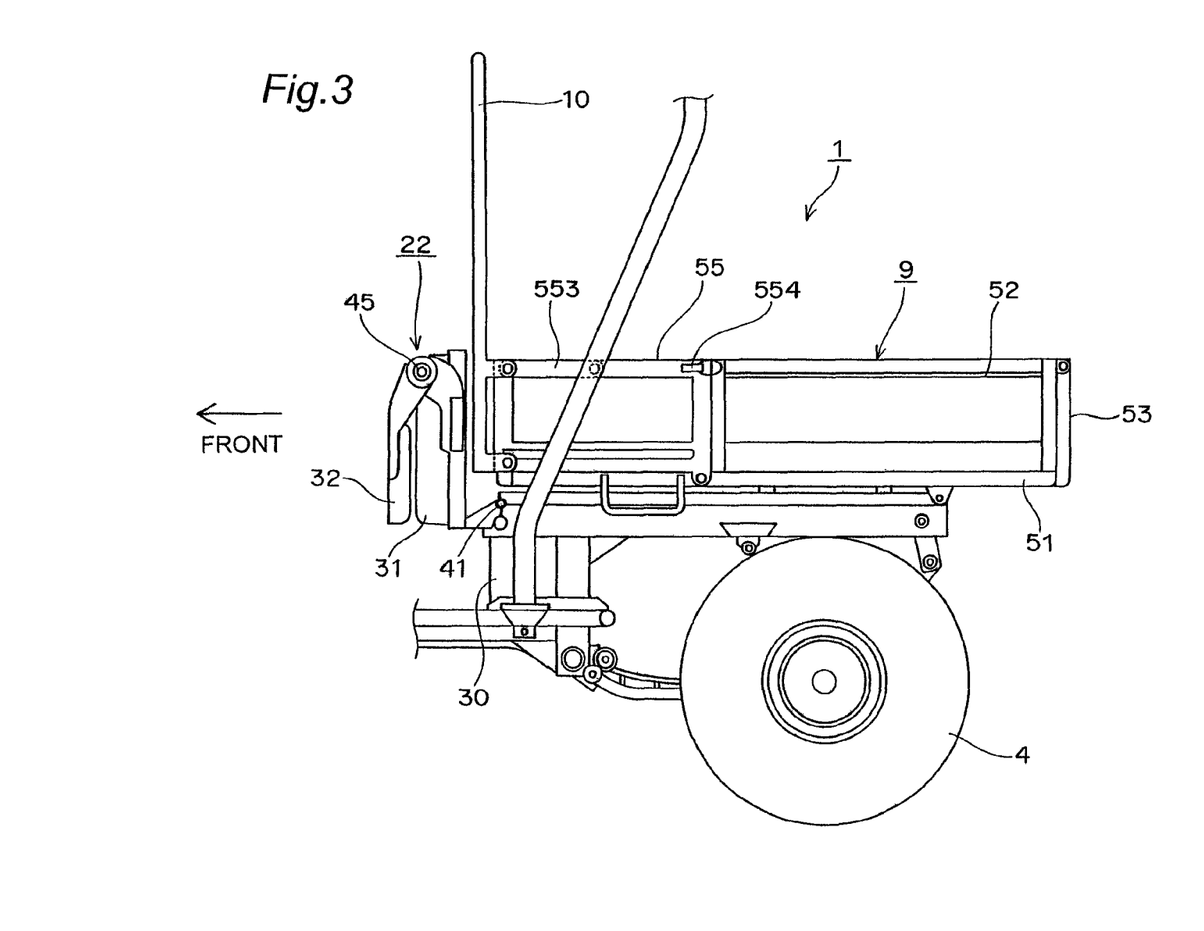
FIG. 3 is a left side view of the cargo bed 9 in 2 passengers transformation.

FIGS. 1 to 3 show a pick-up style utility vehicle 1 with an expandable cargo bed according to a first embodiment of the present invention. The pick-up style utility vehicle 1 is changeable between 4 passengers transformation contracting a cargo bed 9, as shown in FIG. 2 and 2 passengers transformation expanding the cargo bed 9 forward, as shown in FIG. 3. The configuration of the pick-up style utility vehicle will be described below in detail with reference to the drawings.

FIG. 1 is a perspective view of the pick-up style utility vehicle 1. The pick-up style utility vehicle 1 has a vehicle body 2 supported by a pair of left and right front wheels 3 and a pair of left and right rear wheels 4. A cabin frame 7 configuring a cabin 6 is provided in an intermediate portion on the vehicle body 2 in a front-rear direction. A hood 8 is provided in front of the cabin frame 7. The cargo bed 9 is provided behind the cabin frame 7. A screen shield 10 partitioning the cargo bed 9 and a riding space is provided at the front end of the cargo bed 9 so as to be position changeable forward and rearward.

The cabin frame 7 surrounding the cabin 6 has a pair of left and right side frame members 11 formed in an inverted U-shape and made of metal pipes, and a cross frame member 12 made of a plurality of metal pipes coupling the side frame members 11. Each of the side frame members 11 has a front side portion 11a extended rearward and upward from near the left or right side portion of the hood 8, a rear side portion 11b extended substantially upward from the left or right side portion at the rear end of the cabin 6, an upper side portion 11c integrally coupling the upper end of the front side portion 11a and the upper end of the rear side portion 11b and extended forward and rearward, and an intermediate vertical portion 11d coupling the intermediate portion of the upper side portion 11c in a front-rear direction and a floor surface 6a.

A bench-shaped front seat 21 is installed in the front half portion of the cabin 6. A bench-shaped rear seat 22 is installed in the rear half portion of the cabin 6. A dashboard (operating portion) 24 having a steering wheel 23 and the like is provided at the front end of the cabin 6.

The bench-shaped front seat 21 has a seat leg 26 erected on the floor surface 6a of the cabin 6, a seat bottom 27 provided on the upper end face of the seat leg 26, and a backrest 29 fixed via supporting stays to the intermediate vertical portions 11d. The bench-shaped front seat 21 is typically extended leftward and rightward to near the left and right ends of the cabin 6, so that two persons can be seated side by side. A driver can be seated on one seating area (left side) and a passenger can be seated on the other seating area.

The bench-shaped rear seat 22 is arranged on the upper side of a box 30 housing an engine (not shown). The rear seat 22 has a seat bottom 31 and a backrest 32. The bench-shaped rear seat 22 is typically extended leftward and rightward to near the left and right ends of the cabin 6, so that two persons can be seated side by side.

As shown in FIGS. 2 and 3, the backrest 32 is rotated about a hinge 45 so as to be folded on the seat bottom 31.

As shown in FIGS. 2 and 3, the seat bottom 31 is rotated about a hinge 41 so as to be erected forward and to be substantially vertical to the box 30.

The cargo bed 9 has a bottom plate 51, a pair of stationary side panels 52 provided substantially perpendicular to the bottom plate 51 along the left and right ends of the bottom plate 51, an openable and closeable gate type rear panel 53 provided at the rear end of the bottom plate 51, and a pair of left and right expandable side panels 55 for expanding the cargo bed 9 forward. The screen shield 10 is coupled to the expandable side panels 55.

Figure 4:
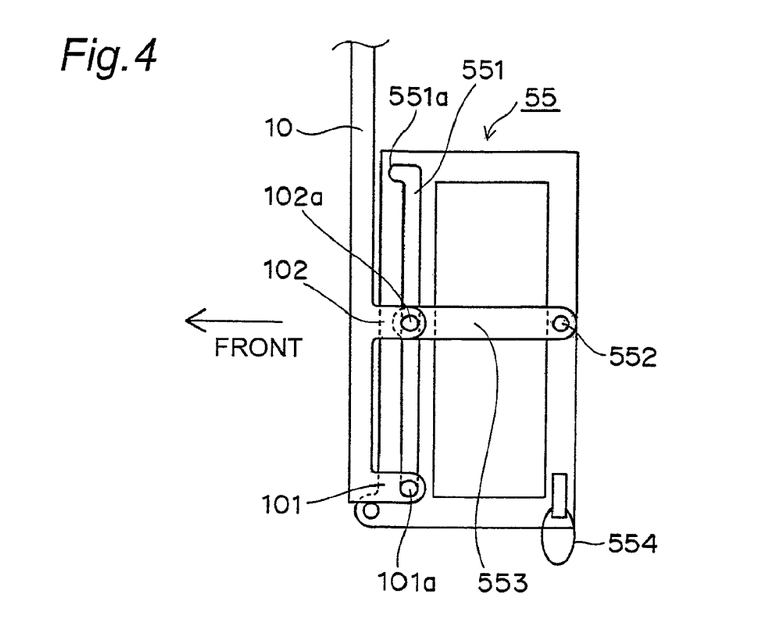
FIG. 4 is a left side view of an expandable side panel 55 in 4 passengers transformation.
Figure 5:
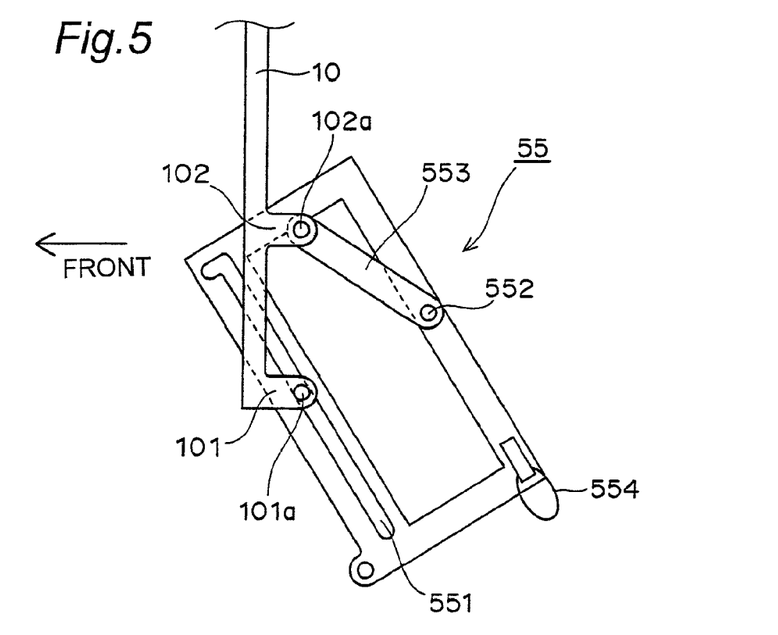
FIG. 5 is a left side view of the expandable side panel 55 while 4 passengers transformation is changed to 2 passengers transformation.
Figure 6:
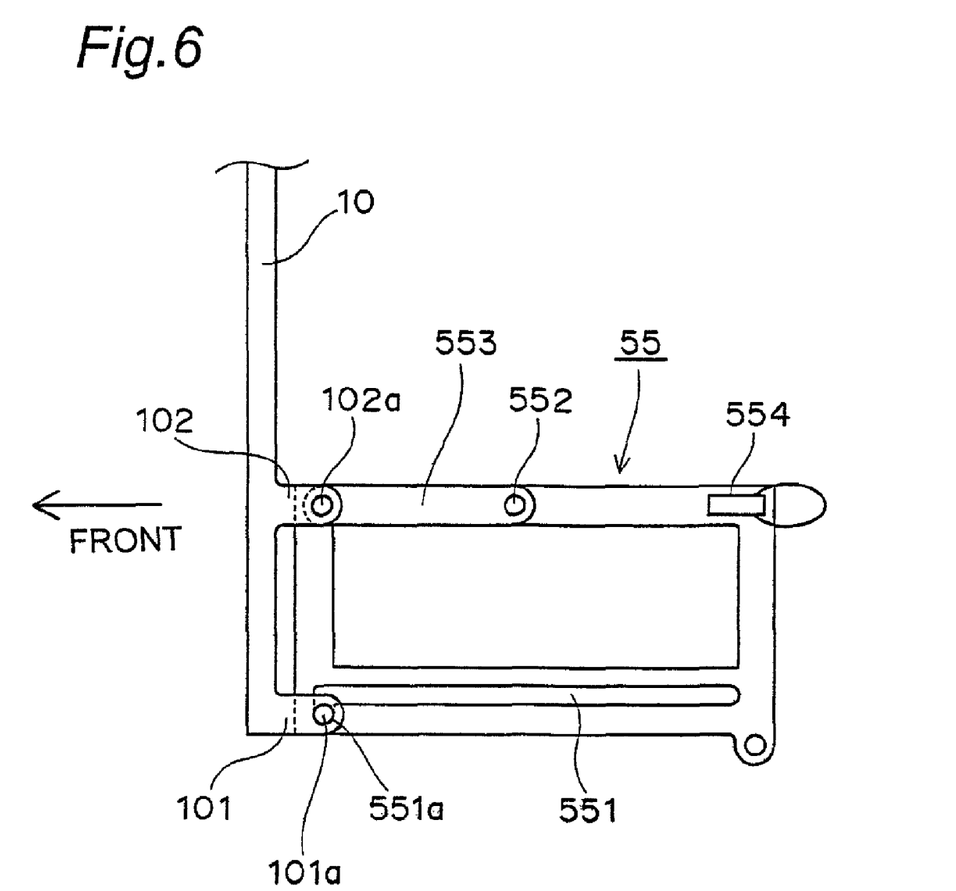
FIG. 6 is a left side view of the expandable side panel 55 in 2 passengers transformation.

The coupling mechanism of the expandable side panel 55 and the screen shield 10 will be described below with reference to FIGS. 4 to 6. The screen shield 10 has in its lower portion a first protrusion portion 101 and a second protrusion portion 102 in an up-down direction protruded rearward. A first engaging protrusion portion 101a of the first protrusion portion 101 is movable in a long hole 551 provided in the expandable side panel 55. A protrusion portion holding portion 551a into which the first engaging protrusion portion 101a is fitted in 2 passengers transformation is provided at the end of the long hole 551. A second engaging protrusion portion 102a of the second protrusion portion 102 is rotatably coupled to a fulcrum 552 of the expandable side panel 55 via a link arm 553.

The expandable side panel 55 has a fixing member 554. As shown in FIG. 2, the expandable side panel 55 is fixed to the bottom plate 51 of the cargo bed 9 by the fixing member 554 in 4 passengers transformation. As shown in FIG. 3, the fixing member 554 fixes the expandable side panel 55 to the stationary side panel 52 in 2 passengers transformation.

The operation of changing 4 passengers transformation shown in FIG. 2 to 2 passengers transformation shown in FIG. 3 and expanding the cargo bed 9 will be described.

When 4 passengers transformation is changed to 2 passengers transformation, the backrest 32 is rotated about the hinge 45 forward and is folded on the seat bottom 31. The seat bottom 31 on which the backrest 32 is folded is rotated about the hinge 41 forward and is erected so as to be substantially vertical to the box 30.

The fixing of the expandable side panel 55 to the bottom plate 51 of the cargo bed 9 by the fixing member 554 is released. As shown in FIG. 5, the expandable side panel 55 in the state of FIG. 4 is rotated forward. With the forward rotation of the expandable side panel 55, the first engaging protrusion portion 101a of the first protrusion portion 101 of the screen shield 10 is moved in the long hole 551 of the expandable side panel 55 upward as seen in FIG. 4. As shown in FIG. 6, when the expandable side panel 55 is rotated 90° forward, the first engaging protrusion portion 101a is located in the protrusion portion holding portion 551a of the long hole 551. The first engaging protrusion portion 101a is fitted into the protrusion portion holding portion 551a formed so as to expand the long hole 551, whereby the first engaging protrusion portion 101a is held in the protrusion portion holding portion 551a. While the expandable side panel 55 is rotated 90° forward, the link arm 553 maintains the coupling of the second engaging protrusion portion 102a of the second protrusion portion 102 and the fulcrum 552 of the expandable side panel 55. In 4 passengers transformation, as shown in FIG. 4, the expandable side panel 55 has a substantially rectangular shape which is short in a front-rear direction and is long in an up-down direction. By the change of 4 passengers transformation to 2 passengers transformation, when the expandable side panel 55 is rotated 90° forward, the expandable side panel 55 has a substantially rectangular shape which is long in a front-rear direction and is short in an up-down direction, as shown in FIG. 6. As a result, the expandable side panel 55 longer in a front-rear direction is formed in front of the stationary side panel 52. The expandable side panel 55 is fixed to the stationary side panel 52 by the fixing member 554. The screen shield 10 is moved forward according to the forward rotation of the expandable side panel 55. Thus, the pick-up style utility vehicle 1 is changed from 4 passengers transformation to 2 passengers transformation to expand the cargo bed 9.

As described above, in this embodiment, the expandable side panel 55 is rotated forward so that the cargo bed 9 can be expanded. Since the screen shield 10 is coupled to the expandable side panel 55, the screen shield 10 is moved forward according to the forward rotation of the expandable side panel 55. Therefore, the screen shield 10 need not be moved. The expanding operation of the cargo bed 9 can be easily performed.

When 2 passengers transformation shown in FIG. 3 is changed to 4 passengers transformation shown in FIG. 2 and the cargo bed 9 is contracted into the non-expanded state, the expanding operation may be reverse. In this case, the expandable side panel 55 is rotated rearward so that the cargo bed 9 can be contracted. The screen shield 10 is moved rearward according to the rearward rotation of the expandable side panel 55. Therefore, the screen shield 10 need not be moved.

The fixing member 554 fixing the expandable side panel 55 to the bottom plate 51 or the stationary side panel 52 may be a clip as shown in FIGS. 2 to 8 or may be any fixing means for fixing members, such as a clamp, a hook, and a pin.

Second Embodiment

Figure 7:
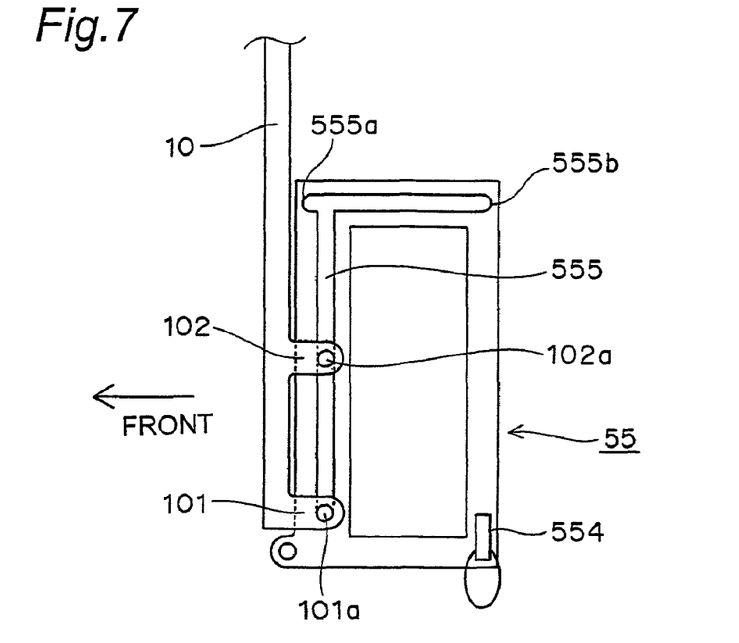
FIG. 7 is a left side view of the expandable side panel 55 in 4 passengers transformation of a pick-up style utility vehicle according to a second embodiment of the present invention.
Figure 8:
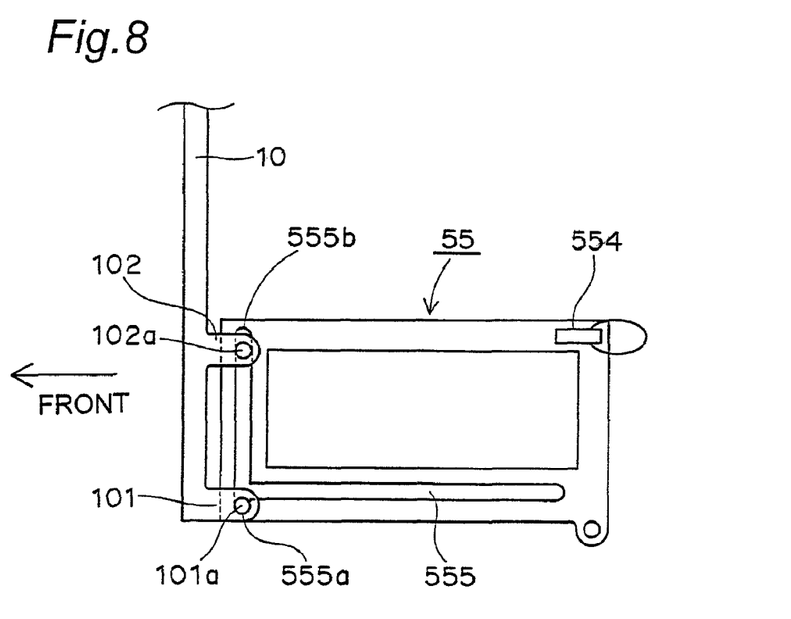
FIG. 8 is a left side view of the expandable side panel 55 in 2 passengers transformation.

FIGS. 7 and 8 are a second embodiment of the present invention. FIG. 7 is a left side view of the expandable side panel 55 in 4 passengers transformation. FIG. 8 is a left side view of the expandable side panel 55 in 2 passengers transformation. The second embodiment has the same configuration as that of the first embodiment except that the following configuration (a) is different. Like components are indicated by like reference numerals.

(a) As shown in FIGS. 7 and 8, the expandable side panel 55 does not have the link arm. The expandable side panel 55 has an L-shaped long hole 555 continuous in a front-rear direction and in an up-down direction. The second engaging protrusion portion 102a of the second protrusion portion 102 of the screen shield 10 is moved in the long hole 555 like the first engaging protrusion portion 101a.

When 4 passengers transformation of FIG. 7 is changed to 2 passengers transformation of FIG. 8, the expandable side panel 55 is rotated 90° forward. The first engaging protrusion portion 101a is moved in the long hole 555 upward as seen in FIG. 7, and as shown in FIG. 8, is located in a first holding portion 555a of the long hole 555 in 2 passengers transformation. The first engaging protrusion portion 101a is fitted into the first holding portion 555a formed so as to expand the long hole 555. The first engaging protrusion portion 101a is held in the first holding portion 555a. The second engaging protrusion portion 102a is moved in the long hole 555 upward as seen in FIG. 7 so as to be moved rearward, and as shown in FIG. 8, is located in a second holding portion 555b of the long hole 555 in 2 passengers transformation. Thus, the expandable side panel 55 rotated 90° and longer in a front-rear direction is formed in front of the stationary side panel 52 to expand the cargo bed 9.

According to the second embodiment, the link arm 553 according to the first embodiment can be unnecessary. The configuration of the expandable side panel 55 can be simplified.

Third Embodiment

Figure 9:
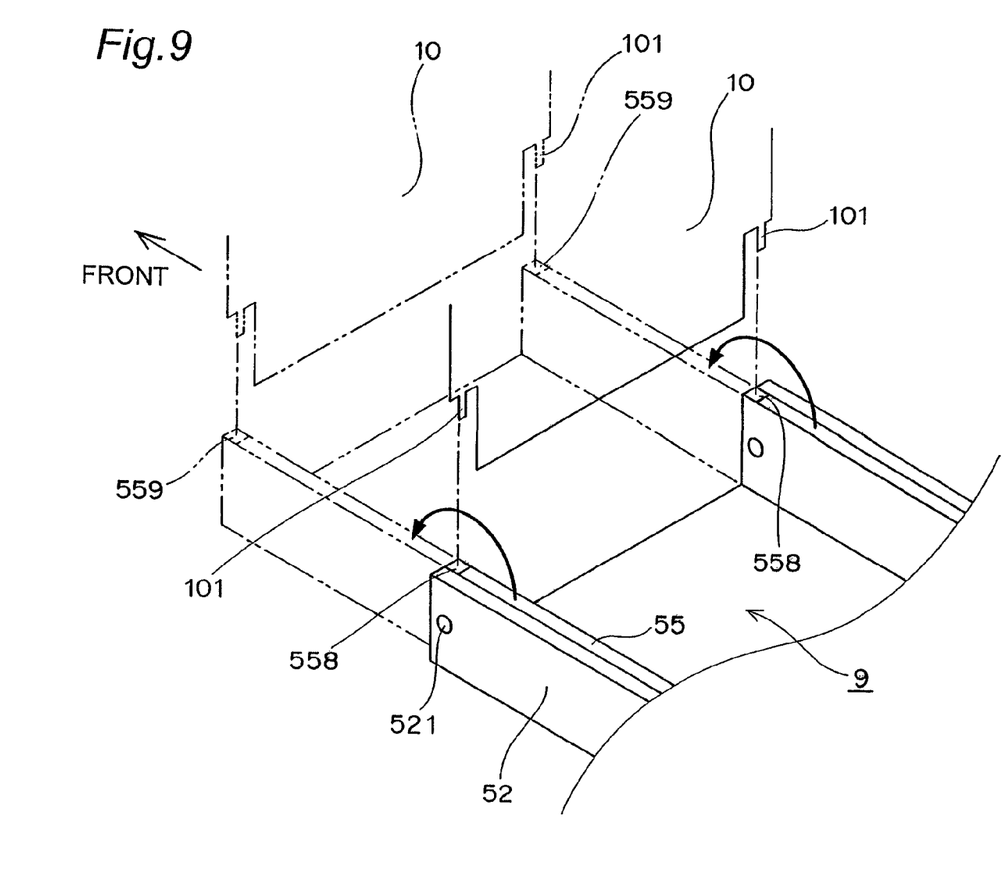
FIG. 9 is a perspective view of the cargo bed 9 and a screen shield 10 of the pick-up style utility vehicle according to a third embodiment of the present invention.

FIG. 9 is a perspective view of the expandable cargo bed 9 and the screen shield 10 according to a third embodiment of the present invention. The third embodiment has the same configuration as that of the first embodiment except that the following configurations (b) and (c) are different. Like components are indicated by like reference numerals.

(b) As shown in FIG. 9, in 4 passengers transformation, the cargo bed 9 has the expandable side panels 55 inside the stationary side panels 52 in a vehicle width direction. The expandable side panels 55 are attached to the stationary side panels 52 so as to be rotatable forward and rearward via hinges 521.

(c) The screen shield 10 is fixed by inserting pins 101 of the screen shield 10 into pin insertion holes 558 or 559 provided in the expandable side panel 55. The locations to insert the pins 101 are changed between the insertion holes 558 and 559 so that the screen shield 10 is movable forward and rearward.

When 4 passengers transformation is changed to 2 passengers transformation, first, the left and right pins 101 of the screen shield 10 are pulled out from the pin insertion holes 558. Then, the expandable side panels 55 are rotated 180° forward via the hinges 521, and as indicated by the imaginary lines of FIG. 9, form the side panels of the expandable portions of the cargo bed 9 so as to be extended forward from the front ends of the stationary side panels 52. Finally, the left and right pins 101 of the screen shield 10 are inserted into the pin insertion holes 559 at the front ends of the expandable side panels 55 located in front of the stationary side panels 52.

According to the third embodiment, the expandable side panels 55 are rotated 180° forward to form the side panels of the expandable portions of the cargo bed 9. The cargo bed 9 can be expanded forward and rearward by the length of the expandable side panels 55 in a front-rear direction.

According to the third embodiment, in 4 passengers transformation, the expandable side panels 55 are located inside the stationary side panels 52 in a vehicle width direction. The expandable side panels 55 may, however, be located outside the stationary side panels 52 in a vehicle width direction. Alternatively, the expandable side panels 55 may be located in the top portions of the stationary side panels 52 in 4 passengers transformation.

Modification Example of the Third Embodiment

Figure 10:
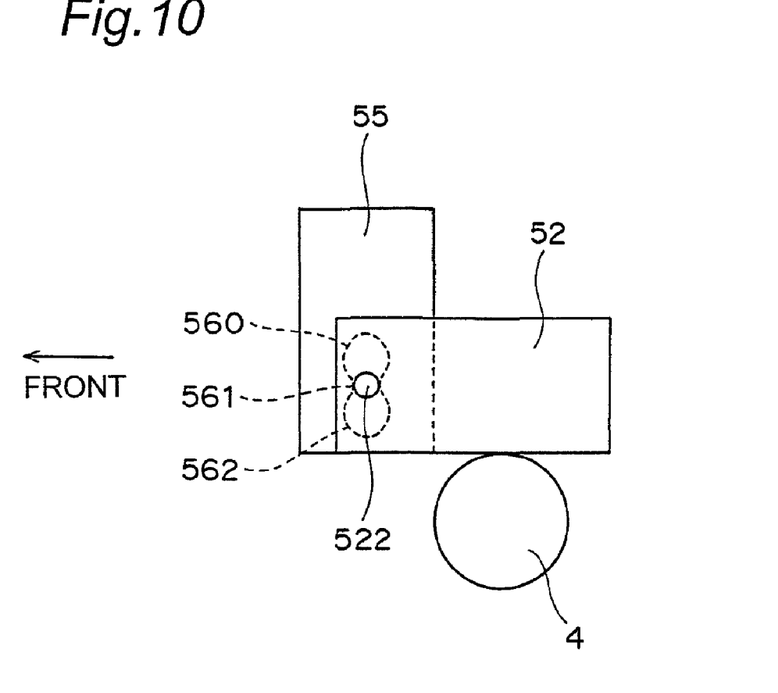
FIG. 10 is a left side view of the expandable side panel 55 in 4 passengers transformation showing a modification example of the third embodiment of the present invention.
Figure 11:
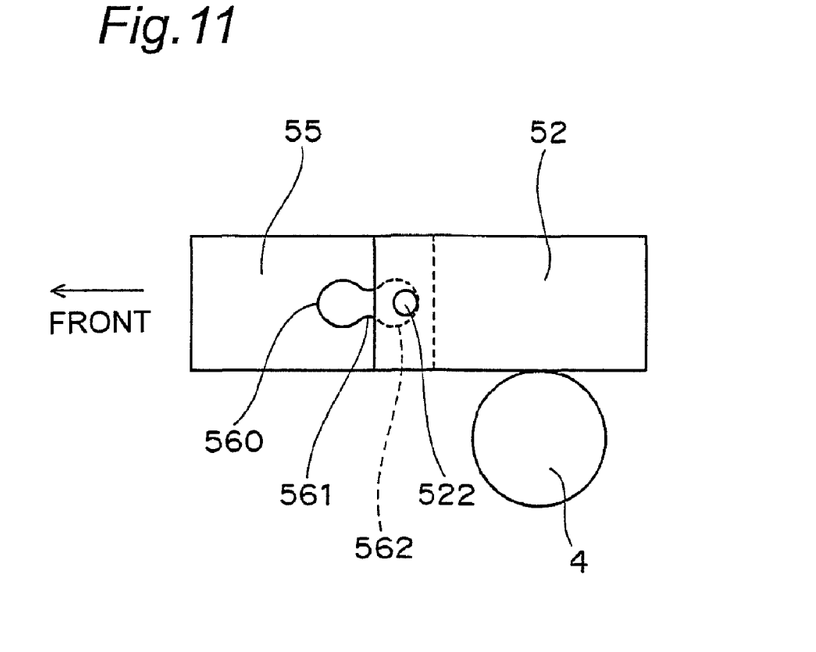
FIG. 11 is a left side view of the expandable side panel 55 in 2 passengers transformation.

According to the third embodiment, in 4 passengers transformation, the expandable side panels 55 are located in a substantially horizontal state so as to be overlapped with the stationary side panels 52 inside the stationary side panels 52 in a vehicle width direction. However, as shown in FIG. 10, in 4 passengers transformation, the expandable side panel 55 may be located in a substantially vertical state so as to be substantially perpendicular to the stationary side panel 52. In this case, as shown in FIG. 11, in 2 passengers transformation, the expandable side panel 55 is rotated 90° forward, is located in a substantially horizontal state on the same straight line as the stationary side panel 52, and forms the side panel of the expandable portion of the cargo bed 9 which is extended forward from the front end of the stationary side panel 52.

Here, the stationary side panel 52 is provided with a third engaging protrusion portion 522 in place of the hinge and a long hole 560 is provided in the expandable side panel 55. Then, the third engaging protrusion portion 522 is movable in the long hole 560. The rotation of the expandable side panel 55 in a front-rear direction can thus be smoothly performed.

The hole diameter of the long hole 560 is preferably reduced to the extent of the outer diameter of the third engaging protrusion portion 522 in a position 561 in the long hole 560 of the third engaging protrusion portion 522 in the non-expanded state of the cargo bed 9 and a position 562 in the long hole 560 of the third engaging protrusion portion 522 in the expanded state of the cargo bed 9. When the long hole 560 has the above configuration, the third engaging protrusion portion 522 is fixed in the positions 561 and 562. Therefore, the expandable side panel 55 can be fixed in the substantially vertical state shown in FIG. 10 and in the substantially horizontal state shown in FIG. 11.

In this embodiment, the third engaging protrusion portion 522 is provided in the stationary side panel 52 and the long hole 560 is provided in the expandable side panel 55. However, the third engaging protrusion portion 522 may be provided in the expandable side panel 55 and the long hole 560 may be provided in the stationary side panel 52.

The present invention is not limited to the configurations of the above embodiments and includes various modification examples contemplated in the scope without departing from the contents described in the scope of claims.

What is claimed is:

1. A pick-up style utility vehicle comprising:
   a front seat;
   a rear seat; and
   a cargo bed in this order from a front of the vehicle; wherein:
   the cargo bed has at least left and right stationary side panels and expandable side panels extended forward from front ends of the stationary side panels, and the cargo bed is changeable between an expanded state in which the cargo bed is expanded forward into a rear riding space in front of the cargo bed and a non-expanded state not occupying the rear riding space;
   the expandable side panels are rotatable forward and rearward about rotational shafts that extend in a vehicle width direction so that the expandable side panels are shiftable between a position in the expanded state and a position in the non-expanded state;
   the pick-up style utility vehicle further comprises a screen shield partitioning the cargo bed and the rear riding space; and
   the expandable side panels are coupled to the screen shield, and the screen shield is shifted in a substantially vertical state between a position in the expanded state and a position in the non-expanded state upon rotation of the expandable side panels forward and rearward.

2. The pick-up style utility vehicle according to claim 1, wherein:
   a first engaging protrusion portion and a second engaging protrusion portion are provided in a lower portion of the screen shield,
   a long hole is provided in each of the expandable side panels,
   the first engaging protrusion portion is movable in the long hole along the long hole, and
   the second engaging protrusion portion is coupled to each of the expandable side panels via a link mechanism.

3. The pick-up style utility vehicle according to claim 1, wherein:
   a first engaging protrusion portion and a second engaging protrusion portion are provided in a lower portion of the screen shield,
   an L-shaped long hole is provided in each of the expandable side panels, and
   the first engaging protrusion portion and the second engaging protrusion portion are movable in the L-shaped long hole along the L-shaped long hole.

4. The pick-up style utility vehicle according to claim 1, wherein each of the expandable side panels is coupled to each of the stationary side panels via a hinge portion provided at the front end of the stationary side panel.

5. The pick-up style utility vehicle according to claim 1, wherein:
   an engaging protrusion portion engaging each of the expandable side panels is provided at the front end of each of the stationary side panels,
   a long hole is provided in each of the expandable side panels, and
   the third engaging protrusion portion is movable in the long hole along the long hole.

6. The pick-up style utility vehicle according to claim 1, wherein each of the expandable side panels has a fixing member, and each of the expandable side panels is fixed by the fixing member in the position in the expanded state and the position in the non-expanded state.

* * * * *